(12) United States Patent
Bristow

(10) Patent No.: US 11,272,708 B2
(45) Date of Patent: Mar. 15, 2022

(54) METHOD OF CONTROLLING GROWTH OF ALS-TOLERANT PLANTS

(71) Applicant: ROTAM AGROCHEM INTERNATIONAL COMPANY LIMITED, Chai Wan (HK)

(72) Inventor: James Timothy Bristow, Chai Wan (HK)

(73) Assignee: ROTAM AGROCHEM INTERNATIONAL CO., LTD., Hong Kong (CN)

( * ) Notice: Subject to any disclaimer, the term of this patent is extended or adjusted under 35 U.S.C. 154(b) by 0 days.

(21) Appl. No.: 15/773,541

(22) PCT Filed: Sep. 13, 2016

(86) PCT No.: PCT/CN2016/098775
§ 371 (c)(1),
(2) Date: May 3, 2018

(87) PCT Pub. No.: WO2017/107581
PCT Pub. Date: Jun. 29, 2017

(65) Prior Publication Data
US 2018/0317487 A1    Nov. 8, 2018

(30) Foreign Application Priority Data
Dec. 23, 2015  (EP) ..................... 15202599

(51) Int. Cl.
A01N 43/707  (2006.01)
A01N 47/36  (2006.01)
A01P 13/02  (2006.01)

(52) U.S. Cl.
CPC ............ *A01N 43/707* (2013.01); *A01P 13/02* (2021.08)

(58) Field of Classification Search
CPC .................. A01P 13/00; A01P 13/02
See application file for complete search history.

(56) References Cited

U.S. PATENT DOCUMENTS

| 5,990,047 | A | 11/1999 | Hacker et al. |
| 5,990,048 | A * | 11/1999 | Dahmen ............... A01N 47/34 504/133 |
| 6,221,809 | B1 | 4/2001 | Hacker et al. |
| 2003/0050193 | A1 * | 3/2003 | Bieringer ............... A01N 47/36 504/136 |

FOREIGN PATENT DOCUMENTS

| CN | 1398517 A | 2/2003 |
| WO | 2012141277 A1 | 10/2012 |
| WO | 2015078243 A1 | 6/2015 |

OTHER PUBLICATIONS

Corn and Soybean Herbicide Chart, University of Wisconsin-Extension, College of Agricultural and Life Sciences, Jan. 2013; obtained from the Internet on Sep. 15, 2019: <https://ag.purdue.edu/btny/weedscience/Documents/Herbicide_MOA_CornSoy_12_2012%5B1%5D.pdf>.*
TriCor 75DF Herbicide brochure, United Phosphorus, Inc. (May 2014).*
International Search Report for Application No. PCT/CN2016/098775 dated Dec. 9, 2016.
European Search Report for Application No. EP 15 20 2599 dated Feb. 12, 2016.
Cai, X. R. et al. "Studies on united virulence of nicosulfuron and metrobizom," Journal of Jilin Agricultrual Sciences, vol. 37, No. 6,Dec. 31, 2012 (Dec. 31, 2012), pp. 43 and 55, pp. 42-43, 55.
Li, G. et al. "Efect of Herbicide on Crop Physiology and Biochemistry," Journal of Anhui Agri. Sci., vol. 35, No. 29, Dec. 31, 2007 (Dec. 31, 2007), pp. 9157-9159.
Koscelny, J.A. et al. "Sylfonylurea herbicides affect hard red winter wheat (*Triticum aestivum*) forage and grain yield," Weed Technology, vol. 10, No. 3, Sep. 30, 1996 (Sep. 30, 1996), pp. 531-534.
Pamela J. S. Hutchinson et al: "Efficacy and Economics of Weed Control Programs in Glyphosate-Resistant Potato (*Solanum tuberosum*) 1", Weed Technology, vol. 17, No. 4, Oct. 1, 2003 (Oct. 1, 2003), pp. 854-865.
William A. Bailey et al: "Control of Italian Ryegrass (*Lolium multiflorum*) in Wheat ( *Triticum aestivum*) with Postemergence Herbicides 1", Weed Technology, vol. 17, No. 3, Jul. 1, 2003 (Jul. 1, 2003), pp. 534-542.
Lance A. Schmidt et al: "Management of Acetolactate Synthase (ALS)—Resistant Common Cocklebur (*Xanthium strumarium*) in Soybean 1", Weed Technology, vol. 18, No. 3, Jul. 1, 2004 (Jul. 1, 2004), pp. 665-674.

* cited by examiner

*Primary Examiner* — John Pak
(74) *Attorney, Agent, or Firm* — Dickinson Wright PLLC

(57) ABSTRACT

A method for the control of the growth of ALS-resistant plants is provided, the method comprising applying to the plants and/or their locus a herbicidally effective amount of a combination of (A) metribuzin and (B) one or more sulfonylureas. A composition comprising a combination of (A) metribuzin and (B) one or more sulfonylureas is also provided.

7 Claims, No Drawings

METHOD OF CONTROLLING GROWTH OF ALS-TOLERANT PLANTS

This U.S. patent application is a 371 national phase entry of PCT/CN2016/098775, filed 13 Sep. 2016, which claims EP Patent Application No. EP15202599.5, filed on Dec. 23, 2015, the contents of which are incorporated herein by reference for all purposes.

BACKGROUND

1. Technical Field

The present invention relates to a method of controlling the growth of ALS-tolerant plants.

2. Related Art

The protection of crops from undesirable vegetation, which inhibits crop growth, is a constantly recurring problem in agriculture. To solve this problem, researchers are trying to develop an extensive range of chemicals and chemical formulations effective in the control of such undesirable growth. Chemical herbicides of many types have been disclosed in the literature and a large number are in commercial use.

However, one problem that is now emerging through continued use of chemical herbicides is the development of plants exhibiting resistance or tolerance to one or more herbicidally active ingredients. One particular class of herbicides that are facing increasing tolerance in the target plants is the sulfonylureas. Sulfonylureas are branched chain amino acid synthesis (ALS) inhibitors. The compounds act by inhibiting biosynthesis of the essential amino acids valine and isoleucine, thereby stopping cell division in the plant and plant growth. There is an increasing occurrence of plants developing ALS inhibitor-tolerance, which in turn reduces or eliminates the effectiveness of sulfonylureas in controlling the growth of such plants. In some cases, certain undesirable plants have developed tolerance to ALS-inhibitors to such an extent that sulfonylureas exhibit little or no activity in their control.

Therefore, there is a need for an improved method for controlling the growth of plants exhibiting ALS inhibitor-tolerance (referred to herein as 'ALS-tolerant plants').

Metribuzin (IUPAC name: 4-amino-6-tert-butyl-4,5-dihydro-3-methylthio-1,2,4-triazin-5-one; 4-amino-6-tert-butyl-3-methylthio-1,2,4-triazin-5(4H)-one) is a triazinone herbicide and has the following chemical structure:

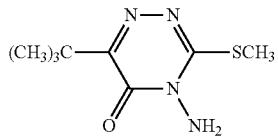

Metribuzin is an inhibitor of photosynthesis in plants. The compound can be absorbed by roots and leaves of the plants and then translocate in the xylem. Metribuzin is active in the control of grasses and broad-leaved weeds. Metribuzin is commercially available in herbicidal compositions and methods for its preparation are known in the art.

Surprisingly, it has been found that a combination of metribuzin with one or more sulfonylureas provides an effective treatment for ALS-tolerant plants and allows the plant growth to be controlled. In particular, it has been found that the combination of metribuzin and one or more sulfonylureas displays a synergistic effect in the control of ALS-tolerant plants and exhibits an activity that is significantly greater than the activity of metribuzin alone or the level of activity expected from the combination of the individual active ingredients.

Combinations of sulfonylureas and triazinone herbicides are suggested in WO 95/08265, U.S. Pat. Nos. 6,872,689, 6,221,809 and 5,990,047. However, there is no specific example of a combination of metribuzin and a sulfonyl urea. More particularly, there is nothing teaching or suggesting that a combination of metribuzin and one or more sulfonylureas exhibits a synergistic effect in the control of ALS-intolerant plants, as has now been found.

SUMMARY

Accordingly, in a first aspect, the present invention provides a method for the control of the growth of ALS-resistant plants, the method comprising applying to the plants and/or their locus a herbicidally effective amount of a combination of (A) metribuzin and (B) one or more sulfonylureas.

In a further aspect, the present invention provides the use of a herbicidally effective amount of a combination of (A) metribuzin and (B) one or more sulfonylureas in the control of the growth of ALS-resistant plants.

The present invention also provides a composition for the control of ALS-tolerant plants comprising a herbicidally effective amount of a combination of (A) metribuzin and (B) one or more sulfonylureas.

DETAILED DESCRIPTION OF EXAMPLE EMBODIMENTS

The term "herbicide" as used herein, refers to a compound that exhibits activity in the control of the growth of plants. The term "herbicidally effective amount" as used herein, refers to the quantity of such a compound or combination of such compounds that is capable of producing a controlling effect on the growth of plants. A controlling effect includes all deviations from the natural development and growth of the plant, including, for example, killing the plant, retardation of one or more aspects of the development and growth of the plant, leaf burn, albinism, dwarfing and the like.

The term "plants" as used herein refers to all physical parts of a plant, including shoots, leaves, needles, stalks, stems, fruit bodies, fruits, seeds, roots, tubers and rhizomes.

If the abbreviation of the "common name" of the herbicides is used in the present specification, it is to be understood as including all conventional derivatives, such as the esters, in particular the lower alkyl esters, especially the methyl ester, and salts, and isomers, in particular the optical isomers, and all commercially available form or forms of the compound. If the "common name" refers to an ester or salt, this also includes all of the other usual derivatives, such as other esters and salts, the free acids, neutral compounds and isomers, in particular optical isomers, and all commercially available form or forms. The chemical compound names stated refer at least to one of the compounds encompassed by the "common name", frequently to a preferred compound. In the case of sulfonylureas, salts also include those which are formed by exchanging a hydrogen atom on the sulfonamide group by a cation.

The present invention employs a combination of (A) metribuzin and (B) one or more sulfonylureas. The invention may employ a plurality of different sulfonylureas, for example a mixture of 2, 3 or more sulfonylureas as component (B). In many preferred embodiments, component (B) is a single sulfonylureas.

As noted above, metribuzin is a known herbicidal compound and is available commercially.

Similarly, suitable herbicidal sulfonylureas for use in the present invention are known in the art and are commercially available. Suitable sulfonylureas for use as component (B) are, for example, amidosulfuron, azimsulfuron, bensulfuron, chlorimuron, chlorsulfuron, cinosulfuron, cyclosulfamuron, ethametsulfuron, ethoxy sulfuron, flazasulfuron, flucetosulfuron, flupyrsulfuron, foramsulfuron, halosulfuron, imazosulfuron, iodosulfuron, iofensulfuron, metazosulfuron, methiopyrisulfuron, metsulfuron, mesosulfuron, monosulfuron, nicosulfuron, orthosulfamuron, oxasulfuron, primisulfuron, propyrisulfuron, prosulfuron, pyrazosulfuron, rimsulfuron, sulfometuron, sulfosulfuron, thifensulfuron, triasulfuron, tribenuron, trifloxysulfuron, triflusulfuron and tritosulfuron. Preferred sulfonylureas are thifensulfuron, tribenuron, metsulfuron, sulfosulfuron, amidosulfuron, mesosulfuron, iodosulfuron, rimsulfuron, nicosulfuron and halosulfuron.

In one embodiment, the present invention employs as component (B) one or more sulfonylureas, with the proviso that component (B) is not metsulfuron-methyl or thifensulfuron-methyl or tribenuron-methyl, in particular with the proviso that the invention does not employ a combination of metribuzin and metsulfuron-methyl or thifensulfuron-methyl or tribenuron-methyl, or with the proviso that the invention does not employ a combination of metribuzin, florasulam and metsulfuron-methyl or thifensulfuron-methyl or tribenuron-methyl.

In general, the application rate of the active ingredients (A) metribuzin and (B) one or more sulfonylureas depends on such factors as the type of weed, type of crop plant, soil type, season, climate, soil ecology and various other factors. The application rate of the components for a given set of conditions can readily be determined by routine trials.

In general the components (A) metribuzin and (B) one or more sulfonylureas can be applied at an application rate of from about 0.03 kilograms/hectare (kg/ha) to about 2 kg/ha of the total amount of active ingredients being applied. Preferably, the application rate is from about 0.05 kg/ha to about 1.5 kg/ha of the total amount of active ingredients.

Metribuzin may be applied in an amount of at least 5 g/ha, preferably at least 10 g/ha, more preferably at least 15 g/ha, still more preferably at least 20 g/ha. Metribuzin may be applied at an application rate of up to 700 g/ha, preferably up to 600 g/ha, more preferably up to 500 g/ha, more preferably still up to 400 g/ha. For many embodiments an application rate of up to 100 g/ha is very suitable. In some preferred embodiments, metribuzin is applied in an amount of 70 g/ha.

The one or more sulfonylureas may be applied in a total amount of at least 1 g/ha, preferably at least 1.5 g/ha, more preferably at least 2 g/ha. In many embodiments, an application rate of at least 5 g/ha, preferably at least 10 g/ha is very suitable. The one or more sulfonylureas may be applied in a total amount of up to 200 g/ha, preferably up to 150 g/ha, more preferably up to 125 g/ha, still more preferably up to 100 g/ha. For many embodiments, an application rate of from 30 g/ha to 80 g/ha is very suitable.

The synergistic effects of (A) metribuzin and (B) one or more sulfonylureas when combined or used together are exhibited in a wide range of weight ratios of the two components. The components (A) and (B) may be applied in similar or equal amounts. Component (B), one or more sulfonylureas, may be applied in larger amounts by weight than component (A), metribuzin. More preferably for many embodiments, component (A) metribuzin is applied in a higher amount by weight than component (B) one or more sulfonylureas.

In the method of the present invention, the weight ratio of (A) metribuzin and (B) one or more sulfonylureas preferably is up to 400:1, more preferably up to 300:1, still more preferably up to 200:1, more preferably still up to 150:1, with a ratio up to 70:1 being preferred in many embodiments. For many embodiments, a weight ratio of (A) metribuzin to (B) one or more sulfonylureas of up to 20:1 is very suitable, preferably up to 15:1, more preferably up to 10:1, for example up to 5:1.

The weight ratio of (A) metribuzin and (B) one or more sulfonylureas is preferably greater than 1:20, more preferably greater than 1:10, still more preferably greater than 1:5, more preferably still greater than 1:2, with a ratio of greater than 1:1 being suitable for many embodiments. The weight ratio of metribuzin to sulfonyl urea preferably lies within the range of from 300:1 to 1:5. Preferably, the weight ratio of (A) metribuzin and (B) one or more sulfonylureas is from about 250:1 to about 1:4, more preferably from about 200:1 to about 1:1 still more preferably from about 100:1 to about 1:1, more preferably still from about 70:1 to about 1:1. In many embodiments, the weight ratio of (A) metribuzin to (B) one or more sulfonylureas is from 1:1 to 15:1, preferably from 1:1 to 10:1, still more preferably from 1:1 to 5:1.

The components (A) metribuzin and (B) one or more sulfonylureas may be applied to the plants and/or their locus simultaneously and/or consecutively. The components may be employed in the form of separate formulations. Alternatively, the components may be employed as a mixture in a single formulation.

The components (A) metribuzin and (B) one or more sulfonylureas may be applied at any stage in the growth of the plants to be controlled. For example, the components may be applied to a locus pre-emergence, for example as a soil treatment. Alternatively or in addition, the components may be applied post-emergence of the plants to be controlled, for example as a foliar application or a soil treatment. The present invention has been found to be particularly effective in the control of a range of ALS-resistant plants when applied post-emergence.

The components (A) metribuzin and (B) one or more sulfonylureas may be applied to the plants or their locus once. Alternatively, the components may be applied a plurality of times. Effective control of undesirable plants has been achieved using a single application of the components or two applications spaced apart in time.

The combination of (A) metribuzin and (B) one or more sulfonylureas is useful in treating a range of crops, including cereals, for example wheat, including both soft wheat and durum wheat, barley, rye, oats, maize, rice, *sorghum*, triticale and related crops; fruit, such as pomes, stone fruit and soft fruit, for example apples, grapes, pears, plums, peaches, almonds, cherries, and berries, for example strawberries, raspberries and blackberries; leguminous plants, for example beans, lentils, peas, soybeans, and peanuts; oil plants, for example rape, mustard, and sunflowers; cucurbitaceae, for example marrows, cucumbers, and melons; fibre plants, for example cotton, flax, hemp, and jute; citrus fruit, for example oranges, lemons, grapefruit and mandarins; vegetables, for example spinach, lettuce, asparagus, cabbages, carrots, onions, tomatoes, potatoes, and paprika; ornamentals, such as flowers, shrubs, broad-leaved trees and evergreens, for example conifers, as well as sugarcane.

In a preferred embodiment, the present invention is used for controlling growth of undesirable plants in cereals, leguminous plants, fibre plants and vegetables, preferably in wheat, including both soft wheat and durum wheat, barley, rye, oats, maize, rice, *sorghum*, triticale, beans, lentils, peas, soybeans, and peanuts, cotton, flax, hemp, jute, spinach, lettuce, asparagus, cabbages, carrots, onions, tomatoes, potatoes, and paprika, more preferably in wheat, including both soft wheat and durum wheat, barley, rye, oats, triticale, maize, rice, soybeans, cotton, tomatoes and potatoes.

The present invention has been found to be particularly effective in the control of undesirable ALS-resistant plants in wheat, including both soft wheat and durum wheat, barley, rye, oats and triticale.

Suitable crops that may be treated include those which are tolerant to metribuzin and sulfonylureas. The tolerance can be natural tolerance produced by selective breeding or can be artificially introduced by genetic modification of the crop plants. In this respect, 'tolerance' means a low susceptibility to damage caused by one or more particular herbicides, in the present case metribuzin and sulfonylureas.

The present invention finds use in the control of a wide range of plants that have developed tolerance or resistance to ALS-inhibitors, in particular sulfonylureas.

ALS-tolerant plants that may be controlled include broadleaved weeds, grasses and sedges, for example, *Abutilon* spp.; *Acalypha* spp.; *Acanthospermum* spp.; *Agrostemma* spp.; *Alopecurus* spp.; *Amaranthus* spp.; *Ambrosia* spp.; *Amsinckia* spp.; *Anoda* spp.; *Anthemis* spp.; *Asperugo* spp.; *Atriplex* spp.; *Avena* spp.; *Boraginaceae* spp.; *Brachiaria* spp.; *Brassica* spp.; *Bromus* spp.; *Camelina* spp.; *Capsella* spp.; *Cardamine* spp.; *Cassia* spp.; *Cenchrus* spp.; *Cerastium* spp.; *Chenopodium* spp.; *Chorispora* spp.; *Claytonia* spp.; *Conyza* spp.; *Cyperus* spp.; *Dactyloctenium* spp.; *Datura* spp.; *Descurainia* spp.; *Desmodium* spp.; *Digitaria* spp.; *Draba* spp.; *Echinochloa* spp.; *Eleusine* spp.; *Elymus* spp.; *Eragrostis* spp.; *Eriochloa* spp.; *Erodium* spp.; *Eupatorium* spp.; *Euphorbia* spp.; *Fallopia* spp.; *Fumaria* spp.; *Galeopsis* spp.; *Galinsoga* spp.; *Galium* spp.; *Geranium* spp.; *Glebionis* spp.; *Helianthus* spp.; *Hibiscus* spp.; *Hordeum* spp.; *Ipomoea* spp.; *Jacquemontia* spp.; *Kochia* spp.; *Lactuca* spp.; *Lamium* spp.; *Lepidium* spp.; *Leptochloa* spp.; *Lithospermum* spp.; *Lolium* spp.; *Matricaria* spp.; *Melochia* spp.; *Mercurialis* spp.; *Mollugo* spp.; *Myosotis* spp.; *Oenothera* spp.; *Oryza* spp.; *Panicum* spp.; *Papaver* spp.; *Persicaria* spp.; *Poa* spp.; *Polemonium* spp.; *Polygonum* spp.; *Portulaca* spp.; *Ranunculus* spp.; *Raphanus* spp.; *Reseda* spp.; *Richardia* spp.; *Rumex* spp.; *Senecio* spp.; *Sesbania* spp.; *Setaria* spp.; *Sida* spp.; *Sinapis* spp.; *Sisymbrium* spp.; *Slda* spp.; *Solanum* spp.; *Sonchus* spp.; *Sorghum* spp.; *Spergula* spp.; *Stellaria* spp.; *Thlaspi* spp.; *Trifolium* spp.; *Triticum* spp.; *Urtica* spp.; *Vaccaria* spp.; *Veronica* spp.; *Vicia* spp.; *Viola* spp.; and *Xanthium* spp.

The combination of (A) metribuzin and (B) one or more sulfonylureas is effective in the control of the following plants which have developed ALS-tolerant varieties: Velvetleaf (*Abutilon theophrasti*); Hophornbeam Copperleaf (*Acalypha ostryifolia*); Bristly Starbur (*Acanthospermum hispidum*); Corncockle (*Agrostemma githago*); Blackgrass (*Alopecurus myosuroides*); Pigweeds (*Amaranthus* spp.); Common ragweed (*Ambrosia artemisiifolia*); Tarweed fiddleneck (*Amsinckia lycopsoides*); Spurred *Anoda* (*Anoda cristata*); Mayweeds (*Anthemis cotula*); Catchweed (Madwort) (*Asperugo procumbens*); Common orache (*Atriplex patula*); Wild-Oat (*Avena fatua*); Wild Oats (*Avena* spp.); Bugloss (*Boraginaceae*); Broadleaf Signalprass (*Brachiaria platyphylla*); Volunteer oilseed rape (*Brassica napus*); Wild Mustards (*Brassica* spp.); Rescuegrass (*Bromus catharticus*); Japanese brome (*Bromus japonicus*); Ripgut brome (*Bromus rigidus*); Cheatgrass (*Bromus tectorum*); Smallseed falseflax (*Camelina microcarpa*); Shepherd's purse (*Capsella bursa-pastoris*); Bittercress (*Cardamine hirsuta*); Sicklepod (*Cassia obtusifolia*); Sandbur (*Cenchrus* spp.); Mousear chickweed (*Cerastium vulgatum*); Fat-hen (*Chenopodium album*); Lambs quarters (*Chenopodium* spp.); Blue mustard (*Chorispora tenella*); Miners lettuce (*Claytonia perfoliata*); Horseweed Marestail (*Conyza canadensis*); Yellow nutsedge (*Cyperus esculentus*); Crowfootgrass (*Dactyloctenium aegyptium*); Jimsonweed (*Datura stramonium*); Tansy mustard (*Descurainia pinnata*); Florida Beggarweed (*Desmodium tortuosum*); Crabgrass (*Digitaria* spp.); Spring whitlowgrass (Vernal) (*Draba verna*); Junglerice (*Echinochloa colonum*); Barnyardgrass (*Echinochloa crus-galli*); Goosegrass (*Eleusine indica*); Common couch (*Elymus repens*); Stinkgrass (*Eragrostis* spp.); Cupgrass (*Eriochloa gracilis*); Filaree, Redstem (*Erodium cicutarium*); Dogfennel (*Eupatorium capillifolium*); Spurge, Sun (*Euphorbia helioscopia*); Spotted Spurge (*Euphorbia maculata*); Black-bindweed (*Fallopia convolvulus*); Fumitory (*Fumaria officinalis*); Hemp-nettle (*Galeopsis*); Galinsoga (*Galinsoga* spp.); Cleavers (*Galium aparine*); Crane's-bill (*Geranium*); Geranium (*Geranium* spp.); Corn Marigold (*Glebionis segetum*); Sunflower (*Helianthus* spp.); Venice Mallow (*Hibiscus trionum*); Little barley (*Hordeum pusillum*); Morningglory, Ivyleaf (*Ipomoea hederacea*); Morningglory, Pitted (*Ipomoea lacunosa*); Tall morningglory (*Ipomoea purpurea*); Smallflower morningglory (*Jacquemontia tamnifolia*); Kochia (*Kochia scoparia*); Prickly lettuce (*Lactuca serriola*); Henbit deadnettle (*Lamium amplexicaule*); Red deadnette (*Lamium purpureum*); Virginia pepperweed (*Lepidium virginicum*); Sprangletop (*Leptochloa* spp.); Carolina Gromwell (*Lithospermum* sp.); Perennial rye-grass (*Lolium perenne*); Pineappleweed (*Matricaria discoidea*); Redweed (*Melochia corchorifolia*); Mercury, Annual (*Mercurialis annua*); Carpetweed (*Mollugo verticillata*); Field forget-me-not (*Myosotis arvensis*); Evening Primrose, Cutleaf (*Oenothera laciniata*); Red Rice (*Oryza sativa*); Witchgrass (*Panicum cap/Hare*); Fall panicum (*Panicum dichotomiflorum*); Browntop Millet (*Panicum ramosum*); Texas panicum (*Panicum texanum*);

Poppy (*Papaver rhoeas*); Pale persicaria (*Persicaria lapathifolia*); Redshank (*Persicaria maculosa*); Annual meadow-grass (*Poa annua*); Bluegrass (*Poa annua*); Bulbous bluegrass (*Poa bulbosa*); Annual polemonium (*Polemonium micranthum*); Jacob's Ladder (*Polemonium reptans*); Prostrate knotweed (*Polygonum aviculare*); Wild buckwheat (*Polygonum convolvulus*); Knotweed (*Polygonum* spp.); Purslane (*Portulaca oleracea*); Buttercup (*Ranunculus* spp.); Wild radish (*Raphanus raphanistrum*); Wild mignonette (*Reseda lutea*); Florida Pusley (*Richardia scabra*); Sheep's sorrel (*Rumex acetosella*); Groundsel (*Senecio*); Sesbania (*Sesbania* spp.); Foxtails (*Setaria* spp.); Green foxtail (*Setaria viridis*); Russian Thistle (*Sida spinosa*); Charlock (*Sinapis arvensis*); Tumble mustard (Jim Hill) (*Sisymbrium altissimum*); Prickly Sida/Teaweed (*Slda spinosa*); Black Nightshade (*Solanum nigrum*); Buffalobur (*Solanum rostratum*); Smooth sow-thistle (*Sonchus oleraceus*); Shattercane (*Sorghum bicolor*); Seedling Johnsongrass (*Sorghum halepense*); Volunteer *sorghum*, (*Sorghum* spp.); Corn spurrey (*Spergula arvensis*); Chickweed (*Stellaria media*); Field pennycress (*Thlaspi arvense*); Clovers (*Trifolium*); Volunteer wheat (*Triticum* spp.); Small nettle (*Urtica ureas*); Cowcockle (*Vaccaria hispanica*); Speedwell, Ivyleaf (*Veronica hederifolia*); Speedwells (*Veronica* spp); Winter vetch (*Vicia villosa*); Field pansy (*Viola arvensis*); Cocklebur (*Xanthium pensylvanicum*).

Specific examples of ALS-tolerant plants that may be controlled very well by the present invention include *Stellaria* spp., *Papaver* spp. and *Matricaria* spp. Specific species of plants that have developed ALS-tolerance and may be controlled include *Stellaria media, Papaver rhoeas, Matricaria chamomilla* and *Matricaria inodora*.

As noted above, components (A) metribuzin and (B) one or more sulfonylureas may be employed in the form of one or more compositions containing the active ingredients.

The compositions of the active components used in the present invention can be formulated in conventional manner, for example by mixing metribuzin and/or one or more sulfonylureas with appropriate auxiliaries. Suitable auxiliaries will depend upon such factors as the type of formulation and the end use. Suitable auxiliaries are commercially available and will be known to the person skilled in the art.

In particular, the composition may comprise one or more auxiliaries selected from extenders, carriers, solvents, surfactants, stabilizers, anti-foaming agents, anti-freezing agents, preservatives, antioxidants, colorants, thickeners, solid adherents, fillers, wetting agents, dispersing agents, lubricants, anticaking agents and diluents. Such auxiliaries are known in the art and are commercially available. Their use in the formulation of compositions for use in the present invention will be apparent to the person skilled in the art.

Suitable formulations for applying the combination of metribuzin and one or more sulfonylureas, whether together or separately, include water-soluble concentrates (SL), emulsifiable concentrates (EC), oil in water emulsions (EW), micro-emulsions (ME), suspension concentrates (SC), oil-based suspension concentrates (OD), flowable suspensions (FS), water-dispersible granules (WDG), water-soluble granules (SG), wettable powders (WP), water soluble powders (SP), granules (GR), encapsulated granules (CG), fine granules (FG), macrogranules (GG), aqueous suspo-emulsions (SE), capsule suspensions (CS) and micro-granules (MG).

Preferred formulation types for compositions to be used in the present invention are water-dispersible granules (WDG), water-soluble granules (SG) and oil-based suspension concentrates (OD).

The compositions may comprise one or more inert fillers. Such inert fillers are known in the art and available commercially. Suitable fillers include, for example, natural ground minerals, such as kaolins, aluminas, talc, chalk, quartz, attapulgite, montmorillonite, and diatomaceous earth, or synthetic ground minerals, such as highly dispersed silicic acid, aluminum oxide, silicates, and calcium phosphates and calcium hydrogen phosphates. Suitable inert fillers for granules include, for example, crushed and fractionated natural minerals, such as calcite, marble, pumice, sepiolite, and dolomite, or synthetic granules of inorganic and organic ground materials, as well as granules of organic material, such as sawdust, coconut husks, corn cobs, and tobacco stalks.

The compositions may include one or more surfactants, which are preferably non-ionic, cationic and/or anionic in nature, and surfactant mixtures which have good emulsifying, dispersing and wetting properties, depending upon the active compound/compounds being formulated. Suitable surfactants are known in the art and are commercially available.

Suitable anionic surfactants can be both so-called water-soluble soaps and water-soluble synthetic surface-active compounds. Soaps which may be used include the alkali metal, alkaline earth metal or substituted or unsubstituted ammonium salts of higher fatty acids ($C_{10}$ to $C_{22}$), for example the sodium or potassium salt of oleic or stearic acid, or of natural fatty acid mixtures.

The surfactant system may comprise an emulsifier, dispersant or wetting agent of ionic or nonionic type. Examples of such surfactants include salts of polyacrylic acids, salts of lignosulphonic acid, salts of phenylsulphonic or naphthalenesulphonic acids, polycondensates of ethylene oxide with fatty alcohols or with fatty acids or with fatty amines, substituted phenols, especially alkylphenols, sulphosuccinic ester salts, taurine derivatives, especially alkyltaurates, and phosphoric esters of polyethoxylated phenols or alcohols.

The presence of at least one surfactant is generally required when the active compound and/or the inert carrier and/or auxiliary/adjuvant are insoluble in water and the vehicle for the final application of the composition is water.

The compositions optionally further comprises one or more polymeric stabilizers. Suitable polymeric stabilizers that may be used in the present invention include, but are not limited to, polypropylene, polyisobutylene, polyisoprene, copolymers of monoolefins and diolefins, polyacrylates, polystyrene, polyvinyl acetate, polyurethanes or polyamides. Suitable stabilizers are known in the art and are commercially available.

The surfactants and polymeric stabilizers mentioned above are generally believed to impart stability to the compositions, in turn allowing the compositions to be formulated, stored, transported and applied.

Suitable anti-foaming agents include all substances which can normally be used for this purpose in agrochemical compositions. Suitable anti-foaming agents are known in the art and are available commercially. Particularly preferred anti-foaming agents are mixtures of polydimethylsiloxanes and perfluroalkylphosphonic acids, such as the silicone anti-foaming agents commercially available from GE or Compton.

Suitable solvents for inclusion in the compositions may be selected from all customary organic solvents which thoroughly dissolve the active compounds metribuzin and flupyrsulfuron. Again, suitable organic solvents for metribuzin and flupyrsulfuron are known in the art. The following may be mentioned as being preferred: N-methyl pyrrolidone, N-octyl pyrrolidone, cyclohexyl-1-pyrrolidone; or a mixture of paraffinic, isoparaffinic, cycloparaffinic and aromatic hydrocarbons, such as SOLVESS™200. Suitable solvents are commercially available.

Suitable preservatives for use in the compositions include all substances which can normally be used for this purpose in agrochemical compositions of this type and again are well known in the art. Suitable examples that may be mentioned include the commercially available preservatives PREVENTOL® (from Bayer AG) and PROXEL® (from Bayer AG).

Suitable antioxidants for use in the compositions are all substances which can normally be used for this purpose in agrochemical compositions, as is known in the art. Preference is given to butylated hydroxytoluene.

Suitable thickeners for use in the compositions include all substances which can normally be used for this purpose in agrochemical compositions, for example xanthan gum, PVOH, cellulose and its derivatives, clay hydrated silicates, magnesium aluminum silicates or a mixture thereof. Again, such thickeners are known in the art and are available commercially.

The compositions may further comprise one or more solid adherents. Such adherents are known in the art and available commercially. They include organic adhesives, including tackifiers, such as celluloses or substituted celluloses, natural and synthetic polymers in the form of powders, granules, or lattices, and inorganic adhesives such as gypsum, silica, or cement.

In the method and use of the present invention, the combination of the active ingredients (A) metribuzin and (B) one or more sulfonylureas can be applied to the plants, such as to the leaves of plants, and/or to their locus where control is desired, such as to the surrounding soil, by any convenient method. The "locus" refers to the place where plants are growing, the place where the plant propagation materials of plants are sown or the place where the plant propagation materials of plants will be sown. Suitable methods for applying the components are known in the art and include coating, spraying, sprinkling, dipping, soaking, injection, irrigation, and the like.

The method of the present invention may employ other pesticides, in addition to the combination of (A) metribuzin and (B) one or more sulfonylureas. For example, compositions employed in the present invention may contain or be mixed with other pesticides, such as fungicides, insecticides and nematicides, growth factor enhancers and fertilizers, to enhance the activity of the treatment of the present invention or to widen its spectrum of activity. Similarly, the method of the present invention may be employed in conjunction with the use of one or more of the aforementioned active ingredients, again to obtain an enhanced efficacy or broader spectrum of activity.

Embodiments of the present invention will now be described by way of the following examples.

Unless otherwise indicated, percentages are weight percent.

EXAMPLES

Formulation Examples a) Water Dispersible Granule (WG) Formulation

A water dispersible granule (WG) formulation was prepared from the components summarized in Table 1 below.

TABLE 1

| Components | Weight % | Function |
| --- | --- | --- |
| Metribuzin | 35% | Active ingredient |
| Thifensulfuron | 20% | Active ingredient |
| Sodium alkyl naphthalene sulfonate blend (MORWET ® EFW POWDER from AkzoNobel N.V.) | 2% | Wetting agent |
| Sodium alkyl naphthalene sulfonate, formaldehyde condensate (MORWET ® D-425 POWDER from AkzoNobel N.V.) | 8% | Dispersing agent |
| Fatty acids, tallow and sodium salts(AGNIQUE ® SOAP L from BASF) | 1% | Antifoaming agent |
| Mannitol | balance to 100% | Filler | b) Oil-Based Suspension Concentrates (OD) Formulation

An oil-based suspension concentrate (OD) formulation was prepared from the components summarized in Table 2 below.

TABLE 2

| Components | Weight % | Function |
| --- | --- | --- |
| Metribuzin | 30% | Active ingredient |
| Tribenuron | 10% | Active ingredient |
| Modified polyether-polysiloxane(Breakthru ® AF9902 from Evonik) | 1% | Antifoaming agent |
| Ethoxylated castor oil(ALKAMULSOR/36 from Rhodia) | 15% | Emulsifier |
| Sodium alkylnaphthalenesulfonate, formaldehyde condensate (MORWET ® D-425 POWDER from AkzoNobel N.V.) | 8% | Dispersing agent |
| Silica | 3% | Thickening agent |
| Vegetable oil | balance to 100% | Diluent | c) Water-Soluble Granule (SG) Formulation

A water-soluble granule (SG) formulation was prepared from the components summarized in Table 3 below.

TABLE 3

| Components | Weight % | Function |
| --- | --- | --- |
| Metribuzin | 70% | Active ingredient |
| Metsulfuron | 5% | Active ingredient |
| Sodium lauryl sulfate (Supralate ® from Witco Inc., Greenwich) | 0.5% | Wetting agent |
| Sodium lignosulfonate(Reax ® 88B from Westvaco Corp) | 5% | Antifoaming agent |
| Sodium hydrogen carbonate ($NaHCO_3$) | 2% | PH regulator |
| Potassium sulfate | balance to 100% | Filler |

A range of different formulations was prepared according to the methods described above. The formulation type and the active ingredients present in the formulations are summarized in Table 4 below. Examples C1 to C11 were prepared for comparison purposes. Examples 1 to 16 are examples of the present invention.

In the formulations prepared, component (A) is metribuzin and components (B1) to (B10) are sulfonylureas as follows:

B1: Thifensulfuron

B2: Tribenuron

B3: Metsulfuron

B4: Sulfosulfuron

B5: Amidosulfuron

B6: Mesosulfuron

B7: Iodosulfuron

B8: Rimsulfuron

B9: Nicosulfuron

B10: Halosulfuron

TABLE 4

| | | Active ingredients (weight %) | | | | | | | | | | |
|---|---|---|---|---|---|---|---|---|---|---|---|---|
| | | | B | | | | | | | | | |
| Example | Type | A | B1 | B2 | B3 | B4 | B5 | B6 | B7 | B8 | B9 | B10 |
| C1 | WG | 70 | — | — | — | — | — | — | — | — | — | — |
| C2 | SG | — | 40 | — | — | — | — | — | — | — | — | — |
| C3 | WG | — | — | 40 | — | — | — | — | — | — | — | — |
| C4 | OD | — | — | — | 40 | — | — | — | — | — | — | — |
| C5 | OD | — | — | — | — | 40 | — | — | — | — | — | — |
| C6 | SG | — | — | — | — | — | 40 | — | — | — | — | — |
| C7 | OD | — | — | — | — | — | — | 40 | — | — | — | — |
| C8 | WG | — | — | — | — | — | — | — | 40 | — | — | — |
| C9 | OD | — | — | — | — | — | — | — | — | 40 | — | — |
| C10 | WG | — | — | — | — | — | — | — | — | — | 40 | — |
| C11 | WG | — | — | — | — | — | — | — | — | — | — | 40 |
| 1 | SG | 35 | 20 | — | — | — | — | — | — | — | — | — |
| 2 | SG | 35 | 25 | — | — | — | — | — | — | — | — | — |
| 3 | OD | 10 | 35 | — | — | — | — | — | — | — | — | — |
| 4 | WG | 30 | — | 10 | — | — | — | — | — | — | — | — |
| 5 | OD | 70 | — | 14 | — | — | — | — | — | — | — | — |
| 6 | WG | 80 | — | 0.4 | — | — | — | — | — | — | — | — |
| 7 | SG | 70 | — | — | 5 | — | — | — | — | — | — | — |
| 8 | WG | 50 | — | — | 5 | — | — | — | — | — | — | — |
| 9 | OD | 15 | — | — | 2.5 | — | — | — | — | — | — | — |
| 10 | WG | 40 | — | — | — | 7 | — | — | — | — | — | — |
| 11 | SG | 35 | — | — | — | — | 20 | — | — | — | — | — |
| 12 | WG | 30 | — | — | — | — | — | 15 | — | — | — | — |
| 13 | WG | 35 | — | — | — | — | — | — | 5 | — | — | — |
| 14 | SG | 35 | — | — | — | — | — | — | — | 20 | — | — |
| 15 | WG | 35 | — | — | — | — | — | — | — | — | 20 | — |
| 16 | WG | 35 | — | — | — | — | — | — | — | — | — | 20 |

Biological Examples

A synergistic effect exists with a combination of two active compounds when the activity of a combination of both active compounds is greater than the sum of the activities of the two active compounds applied alone.

The expected activity for a given combination of two active compounds can be calculated by the so called "Colby equation" (see S. R. Colby, "Calculating Synergistic and Antagonistic Responses of Herbicide Combinations", Weeds 1967, 15, 20-22):

whereby:

$$E = A + B - (A \times B / 100)$$

wherein:

A=the activity percentage of compound A when active compound A is empolyed at an application rate of m g/ha;

B=the activity percentage of compound B when active compound B is empolyed at an application rate of n g/ha;

E=the percentage of estimated activity when compounds A and B are empolyed together at an application rate of m g/ha and n g/ha.

If the actual activity observed for the combination of compounds A and B is greater than that calculated using the above formula, then the activity of the combination is superadditive, that is synergism is present.

The formulations of Examples C1 to C11 and 1 to 16 were tested for their biological activity against plants exhibiting resistance to sulfonylureas as follows:

Seeds of normal wild variety and ALS-resistant variant of each of *Stellaria media, Papaver rhoeas, Matricaria chamomilla* and *Matricaria inodora* were sown in trays of peat-based compost placed in a glasshouse to allow germination. At the cotyledon stage, four evenly sized seedlings were transplanted into each of 9 cm diameter plastic pots containing loam soil mixed with 25% by volume horticultural silver sand and further blended with coarse grit in the ratio 3:1. The resulting potting medium was supplemented with Osmacote slow-release fertilizer (16:8:9+Mg) to provide 1.4 g per 0.35 L pot.

The formulations of each of Examples C1 to C11 and 1 to 16 were applied to the seedlings by spraying. Three replicate pots were used per treatment. Prior to spraying, the plants were watered overhead. To ensure the foliage was dry, water was not applied on the day of spraying, with the last overhead watering being the day before spraying. The herbicide formulations were made up with mains tap water. The laboratory track sprayer was set up with a Lurmark OIE80 Even spray nozzle to deliver 200±20 L/ha using gear 4 and a pressure of 210 Pa (30 psi). The application rates of the active ingredients are set out in Table 5 below.

Following spraying, the plants were returned to the glass-house and the sprayed pots were arranged in three randomized blocks. The temperature of the glasshouse ranged from 12.2° C. to 16.1° C. by day and 10.9° C. to 13.3° C. at night. The relative humidity ranged from 75% to 101%.

Throughout the experiment, the plants were watered to maintain the soil close to the field capacity. Following herbicide treatment, the plants were watered by sub-irrigation using individual plastic dishes for each pot to avoid any risk of cross contamination.

The visual percentage of control based on a 0-100 linear scale was assessed 21 days after treatment (DAT). The linear scale ranged from 0 (no effect) to 100 (dead plants).

The results of the visual inspections are summarized in Table 6 below. In Table 6, 'Obs' indicates an observed result and 'Exp' indicates the result expected from applying the Colby equation, discussed above.

TABLE 5

| Example No. | Application rate (g/ha) | | | | | | | | | | |
|---|---|---|---|---|---|---|---|---|---|---|---|
| | A | B1 | B2 | B3 | B4 | B5 | B6 | B7 | B8 | B9 | B10 |
| Untreated | 0 | 0 | 0 | 0 | 0 | 0 | 0 | 0 | 0 | 0 | 0 |
| C1 | 20 | — | — | — | — | — | — | — | — | — | — |
| C1 | 30 | — | — | — | — | — | — | — | — | — | — |
| C1 | 50 | — | — | — | — | — | — | — | — | — | — |
| C1 | 70 | — | — | — | — | — | — | — | — | — | — |
| C1 | 200 | — | — | — | — | — | — | — | — | — | — |
| C1 | 400 | — | — | — | — | — | — | — | — | — | — |
| C2 | — | 40 | — | — | — | — | — | — | — | — | — |
| C2 | — | 50 | — | — | — | — | — | — | — | — | — |
| C2 | — | 70 | — | — | — | — | — | — | — | — | — |
| C3 | — | — | 10 | — | — | — | — | — | — | — | — |
| C3 | — | — | 14 | — | — | — | — | — | — | — | — |
| C3 | — | — | 1 | — | — | — | — | — | — | — | — |
| C4 | — | — | — | 5 | — | — | — | — | — | — | — |
| C5 | — | — | — | — | 70 | — | — | — | — | — | — |
| C6 | — | — | — | — | — | 40 | — | — | — | — | — |
| C7 | — | — | — | — | — | — | 15 | — | — | — | — |
| C8 | — | — | — | — | — | — | — | 10 | — | — | — |
| C9 | — | — | — | — | — | — | — | — | 40 | — | — |
| C10 | — | — | — | — | — | — | — | — | — | 40 | — |
| C11 | — | — | — | — | — | — | — | — | — | — | 40 |
| 1 | 70 | 40 | — | — | — | — | — | — | — | — | — |
| 2 | 70 | 50 | — | — | — | — | — | — | — | — | — |
| 3 | 20 | 70 | — | — | — | — | — | — | — | — | — |
| 4 | 30 | — | 10 | — | — | — | — | — | — | — | — |
| 5 | 70 | — | 14 | — | — | — | — | — | — | — | — |
| 6 | 200 | — | 1 | — | — | — | — | — | — | — | — |
| 7 | 70 | — | — | 5 | — | — | — | — | — | — | — |
| 8 | 50 | — | — | 5 | — | — | — | — | — | — | — |
| 9 | 30 | — | — | 5 | — | — | — | — | — | — | — |
| 10 | 400 | — | — | — | 70 | — | — | — | — | — | — |
| 11 | 70 | — | — | — | — | 40 | — | — | — | — | — |
| 12 | 30 | — | — | — | — | — | 15 | — | — | — | — |
| 13 | 70 | — | — | — | — | — | — | 10 | — | — | — |
| 14 | 70 | — | — | — | — | — | — | — | 40 | — | — |
| 15 | 70 | — | — | — | — | — | — | — | — | 40 | — |
| 16 | 70 | — | — | — | — | — | — | — | — | — | 40 |

TABLE 6

| | Percentage control (21 DAT) Type of weeds | | | | | | | | | | | |
|---|---|---|---|---|---|---|---|---|---|---|---|---|
| | Stellaria media (wild) | Stellaria media (ALS resistant) | | Papaver rhoeas (wild) | Papaver rhoeas (ALS resistant) | | Matricaria chamomilla (wild) | Matricaria chamomilla (ALS resistant) | | Matricaria inodora (wild) | Matricaria inodora (ALS resistant) | |
| Example No. | Obs | Obs | Exp | Obs | Obs | Exp | Obs | Obs | Exp | Obs | Obs | Exp |
| Untreated | 0 | 0 | 0 | 0 | 0 | 0 | 0 | 0 | 0 | 0 | 0 | 0 |
| C1 | 15 | 8 | — | 12 | 2 | — | 5 | 1 | — | 8 | 2 | — |
| C1 | 28 | 14 | — | 25 | 10 | — | 12 | 5 | — | 15 | 10 | — |
| C1 | 48 | 25 | — | 36 | 24 | — | 20 | 12 | — | 30 | 18 | — |
| C1 | 52 | 36 | — | 44 | 30 | — | 35 | 28 | — | 42 | 25 | — |
| C1 | 68 | 55 | — | 60 | 46 | — | 56 | 45 | — | 70 | 58 | — |
| C1 | 85 | 70 | — | 72 | 55 | — | 70 | 60 | — | 85 | 65 | — |
| C2 | 30 | 0 | — | 32 | 0 | — | 22 | 0 | — | 28 | 0 | — |
| C2 | 55 | 0 | — | 45 | 0 | — | 34 | 0 | — | 40 | 0 | — |
| C2 | 71 | 10 | — | 63 | 5 | — | 58 | 5 | — | 60 | 0 | — |
| C3 | 28 | 0 | — | 20 | 0 | — | 12 | 0 | — | 21 | 0 | — |
| C3 | 34 | 0 | — | 28 | 0 | — | 22 | 0 | — | 30 | 0 | — |
| C3 | 5 | 0 | — | 0 | 0 | — | 2 | 0 | — | 4 | 0 | — |
| C4 | 40 | 0 | — | 30 | 0 | — | 32 | 0 | — | 30 | 0 | — |
| C5 | 64 | 5 | — | 50 | 10 | — | 50 | 0 | — | 60 | 5 | — |
| C6 | 55 | 0 | — | 42 | 0 | — | 45 | 0 | — | 48 | 0 | — |
| C7 | 50 | 0 | — | 30 | 0 | — | 40 | 0 | — | 42 | 0 | — |
| C8 | 48 | 0 | — | 32 | 0 | — | 40 | 0 | — | 30 | 0 | — |
| C9 | 35 | 0 | — | 25 | 0 | — | 36 | 0 | — | 40 | 0 | — |
| C10 | 40 | 0 | — | 36 | 0 | — | 28 | 0 | — | 35 | 0 | — |
| C11 | 50 | 10 | — | 40 | 0 | — | 36 | 10 | — | 42 | 5 | — |
| 1 | 98 | 90 | 36 | 90 | 88 | 30 | 87 | 85 | 28 | 85 | 80 | 25 |
| 2 | 98 | 92 | 36 | 95 | 90 | 30 | 90 | 88 | 28 | 95 | 92 | 25 |
| 3 | 80 | 70 | 17.2 | 82 | 70 | 6.9 | 80 | 78 | 5.95 | 82 | 75 | 2 |
| 4 | 86 | 72 | 14 | 78 | 69 | 10 | 75 | 70 | 5 | 78 | 70 | 10 |
| 5 | 80 | 70 | 36 | 75 | 70 | 30 | 78 | 72 | 28 | 75 | 70 | 25 |
| 6 | 88 | 78 | 55 | 75 | 70 | 46 | 75 | 70 | 45 | 84 | 78 | 58 |
| 7 | 95 | 85 | 36 | 92 | 84 | 30 | 88 | 82 | 28 | 92 | 88 | 25 |
| 8 | 85 | 80 | 25 | 80 | 75 | 24 | 80 | 75 | 12 | 85 | 80 | 18 |
| 9 | 75 | 70 | 14 | 72 | 70 | 10 | 68 | 62 | 5 | 78 | 72 | 10 |
| 10 | 99 | 94 | 71.5 | 95 | 90 | 59.5 | 98 | 92 | 60 | 96 | 90 | 66.75 |
| 11 | 90 | 88 | 36 | 88 | 85 | 30 | 90 | 85 | 28 | 95 | 92 | 25 |
| 12 | 80 | 70 | 14 | 75 | 70 | 10 | 70 | 65 | 5 | 80 | 75 | 10 |
| 13 | 85 | 80 | 36 | 78 | 72 | 30 | 81 | 75 | 28 | 82 | 78 | 25 |
| 14 | 96 | 85 | 36 | 95 | 90 | 30 | 90 | 85 | 28 | 95 | 90 | 25 |
| 15 | 98 | 88 | 36 | 94 | 89 | 30 | 92 | 88 | 28 | 92 | 90 | 25 |
| 16 | 95 | 90 | 42.4 | 92 | 88 | 30 | 95 | 90 | 35.2 | 95 | 88 | 28.75 |

From a review of the data presented in Tables 5 and 6 above, as expected, metribuzin caused damage to both the ALS-tolerant and wild plants (composition C1).

Further, as expected, the sulfonylureas, namely Thifensulfuron, Tribenuron, Metsulfuron, Sulfosulfuron, Amidosulfuron, Mesosulfuron, Iodosulfuron, Rimsulfuron, Nicosulfuron, Halosulfuron had little or no effect on all ALS-tolerant plants (composition C2-C11), while significantly damaging the wild (non-tolerant) plants.

Surprisingly, the combination of metribuzin with each of the sulfonylureas, caused damage to the ALS-tolerant plants that was significantly in excess of that caused by the metribuzin alone. The data demonstrate that a combination of metribuzin and a sulfonyl urea exhibits synergy in the control of ALS-tolerant plants.

Features and aspects of the present invention are summarized in the following numbered clauses:

1. A method for the control of the growth of ALS-resistant plants comprising applying to the plants and/or their locus a herbicidally effective amount of a combination of (A) metribuzin and (B) one or more sulfonylureas.

2. The method according to clause 1, wherein component (B) is a single sulfonylurea.

3. The method according to either of clauses 1 or 2, wherein the one or more sulfonylureas are selected from amidosulfuron, azimsulfuron, bensulfuron, chlorimuron, chlorsulfuron, cinosulfuron, cyclosulfamuron, ethametsulfuron, ethoxy sulfuron, flazasulfuron, flucetosulfuron, flupyrsulfuron, foramsulfuron, halosulfuron, imazosulfuron, iodosulfuron, iofensulfuron, metazosulfuron, methiopyrisulfuron, metsulfuron, mesosulfuron, monosulfuron, nicosulfuron, orthosulfamuron, oxasulfuron, primisulfuron, propyrisulfuron, prosulfuron, pyrazosulfuron, rimsulfuron, sulfometuron, sulfosulfuron, thifensulfuron, triasulfuron, tribenuron, trifloxysulfuron, triflusulfuron and tritosulfuron.

4. The method according to clause 3, wherein the one or more sulfonylureas are selected from thifensulfuron, tribenuron, metsulfuron, sulfosulfuron, amidosulfuron, mesosulfuron, iodosulfuron, rimsulfuron, nicosulfuron and halosulfuron.

5. The method according to any preceding clause, wherein the components (A) metribuzin and (B) one or more sulfonylureas are applied at an application rate of from 0.03 kilograms/hectare (kg/ha) to 2 kg/ha of the total amount of active ingredients being applied.

6. The method according to clause 5, wherein the components (A) metribuzin and (B) one or more sulfonylureas are applied at an application rate of from 0.05 kg/ha to 1.5 kg/ha of the total amount of active ingredients.

7. The method according to any preceding clause, wherein component (A) metribuzin is applied in an amount of at least 5 g/ha.

8. The method according to clause 7, wherein component (A) metribuzin is applied in an amount of at least 20 g/ha.

9. The method according to any preceding clause, wherein component (A) metribuzin is applied in an amount of up to 700 g/ha.

10. The method according to clause 9, wherein component (A) metribuzin is applied in an amount of 70 g/ha.

11. The method according to any preceding clause, wherein the one or more sulfonylureas are applied in a total amount of at least 1 g/ha.

12. The method according to clause 11, wherein the one or more sulfonylureas are applied in a total amount of at least 2 g/ha.

13. The method according to any preceding clause, wherein the one or more sulfonylureas are applied in a total amount of up to 200 g/ha.

14. The method according to clause 13, wherein the one or more sulfonylureas are applied in a total amount of up to 100 g/ha.

15. The method according to any preceding clause, wherein the weight ratio of (A) metribuzin and (B) one or more sulfonylureas is up to 400:1.

16. The method according to clause 15, wherein the weight ratio of (A) metribuzin and (B) one or more sulfonylureas is up to 70:1.

17. The method according to any preceding clause, wherein the weight ratio of (A) metribuzin and (B) one or more sulfonylureas is up to 10:1.

18. The method according to any preceding clause, wherein the weight ratio of (A) metribuzin and (B) one or more sulfonylureas is greater than 1:20.

19. The method according to clause 18, wherein the weight ratio of (A) metribuzin and (B) one or more sulfonylureas is greater than 1:5.

20. The method according to clause 19, wherein the weight ratio of (A) metribuzin and (B) one or more sulfonylureas is greater than 1:1

21. The method according to any preceding clause, wherein the weight ratio of (A) metribuzin and (B) one or more sulfonylureas is from 250:1 to 1:4.

22. The method according to clause 21, wherein the weight ratio of (A) metribuzin and (B) one or more sulfonylureas is from 100:1 to 1:1.

23. The method according to clause 22, wherein the weight ratio of (A) metribuzin and (B) one or more sulfonylureas is from 70:1 to 1:1.

24. The method according to any preceding clause, wherein the components (A) metribuzin and (B) one or more sulfonylureas are applied to the plants and/or their locus simultaneously and/or consecutively.

25. The method according to any preceding clause, wherein the components (A) metribuzin and (B) one or more sulfonylureas are applied to the plants and/or their locus post-emergence.

26. The method according to any preceding clause, wherein the ALS-resistant plants are present in a crop of wheat, including both soft wheat and durum wheat, barley, rye, oats, maize, rice, *sorghum*, triticale, beans, lentils, peas, soybeans, and peanuts, cotton, flax, hemp, jute, spinach, lettuce, asparagus, cabbages, carrots, onions, tomatoes, potatoes, or paprika.

27. The method according to clause 26, wherein the ALS-resistant plants are present in a crop of wheat, including both soft wheat and durum wheat, barley, rye, oats, triticale, maize, rice, soybeans, cotton, tomatoes and potatoes.

28. The method according to clause 27, wherein the ALS-resistant plants are present in a crop of wheat, including both soft wheat and durum wheat, barley, rye, oats and triticale.

29. The method according to any preceding clause, wherein the ALS-tolerant plants comprise *Stellaria* spp., *Papaver* spp. or *Matricaria* spp.

30. The method according to clause 29, wherein the ALS-tolerant plants comprise *Stellaria media, Papaver rhoeas, Matricaria chamomilla* or *Matricaria inodora*.

31. The method according to any preceding clause, wherein components (A) and (B) are applied in the form of one or more formulations selected from water-soluble concentrates (SL), emulsifiable concentrates (EC), oil in water emulsions (EW), micro-emulsions (ME), suspension concentrates (SC), oil-based suspension concentrates (OD), flowable suspensions (FS), water-dispersible granules (WDG), water-soluble granules (SG), wettable powders (WP), water soluble powders (SP), granules (GR), encapsulated granules (CG), fine granules (FG), macrogranules (GG), aqueous suspo-emulsions (SE), capsule suspensions (CS) and microgranules (MG).

32. The method according to clause 31, wherein components (A) and (B) are applied in the form of one or more formulations selected from water-dispersible granules (WDG), water-soluble granules (SG) and oil-based suspension concentrates (OD).

33. The use of a herbicidally effective amount of a combination of (A) metribuzin and (B) one or more sulfonylureas in the control of the growth of ALS-resistant plants.

34. The use according to clause 33, wherein component (B) is a single sulfonyl urea.

35. The use according to either of clauses 33 or 34, wherein the one or more sulfonylureas are selected from amidosulfuron, azimsulfuron, bensulfuron, chlorimuron, chlorsulfuron, cinosulfuron, cyclosulfamuron, ethametsulfuron, ethoxysulfuron, flazasulfuron, flucetosulfuron, flupyrsulfuron, foramsulfuron, halosulfuron, imazosulfuron, iodosulfuron, iofensulfuron, metazosulfuron, methiopyrisulfuron, metsulfuron, mesosulfuron, monosulfuron, nicosulfuron, orthosulfamuron, oxasulfuron, primisulfuron, propyrisulfuron, prosulfuron, pyrazosulfuron, rimsulfuron, sulfometuron, sulfosulfuron, thifensulfuron, triasulfuron, tribenuron, trifloxysulfuron, triflusulfuron and tritosulfuron.

36. The use according to clause 35, wherein the one or more sulfonylureas are selected from thifensulfuron, tribenuron, metsulfuron, sulfosulfuron, amidosulfuron, mesosulfuron, iodosulfuron, rimsulfuron, nicosulfuron and halosulfuron.

37. The use according to any of clauses 33 to 36, wherein the components (A) metribuzin and (B) one or more sulfonylureas are applied at an application rate of from 0.03 kilograms/hectare (kg/ha) to 2 kg/ha of the total amount of active ingredients being applied.

38. The use according to clause 37, wherein the components (A) metribuzin and (B) one or more sulfonylureas are applied at an application rate of from 0.05 kg/ha to 1.5 kg/ha of the total amount of active ingredients.

39. The use according to any of clauses 33 to 38, wherein component (A) metribuzin is applied in an amount of at least 5 g/ha.

40. The use according to clause 39, wherein component (A) metribuzin is applied in an amount of at least 20 g/ha.

41. The use according to any of clauses 33 to 40, wherein component (A) metribuzin is applied in an amount of up to 700 g/ha.

42. The use according to clause 41, wherein component (A) metribuzin is applied in an amount of 70 g/ha.

43. The use according to any of clauses 33 to 42, wherein the one or more sulfonylureas are applied in a total amount of at least 1 g/ha.

44. The use according to clause 43, wherein the one or more sulfonylureas are applied in a total amount of at least 2 g/ha.

45. The use according to any of clauses 33 to 44, wherein the one or more sulfonylureas are applied in a total amount of up to 200 g/ha.

46. The use according to clause 45, wherein the one or more sulfonylureas are applied in a total amount of up to 100 g/ha.

47. The use according to any of clauses 33 to 46, wherein the weight ratio of (A) metribuzin and (B) one or more sulfonylureas is up to 400:1.

48. The use according to clause 47, wherein the weight ratio of (A) metribuzin and (B) one or more sulfonylureas is up to 70:1.

49. The use according to any of clauses 33 to 48, wherein the weight ratio of (A) metribuzin and (B) one or more sulfonylureas is up to 10:1.

50. The use according to any of clauses 33 to 49, wherein the weight ratio of (A) metribuzin and (B) one or more sulfonylureas is greater than 1:20.

51. The use according to clause 50, wherein the weight ratio of (A) metribuzin and (B) one or more sulfonylureas is greater than 1:5.

52. The use according to clause 51, wherein the weight ratio of (A) metribuzin and (B) one or more sulfonylureas is greater than 1:1

53. The use according to any of clauses 33 to 52, wherein the weight ratio of (A) metribuzin and (B) one or more sulfonylureas is from 250:1 to 1:4.

54. The use according to clause 53, wherein the weight ratio of (A) metribuzin and (B) one or more sulfonylureas is from 100:1 to 1:1.

55. The use according to clause 54, wherein the weight ratio of (A) metribuzin and (B) one or more sulfonylureas is from 70:1 to 1:1.

56. The use according to any of clauses 33 to 55, wherein the components (A) metribuzin and (B) one or more sulfonylureas are applied to the plants and/or their locus simultaneously and/or consecutively.

57. The use according to any of clauses 33 to 56, wherein the components (A) metribuzin and (B) one or more sulfonylureas are applied to the plants and/or their locus post-emergence.

58. The use according to any of clauses 33 to 57, wherein the ALS-resistant plants are present in a crop of wheat, including both soft wheat and durum wheat, barley, rye, oats, maize, rice, *sorghum*, triticale, beans, lentils, peas, soybeans, and peanuts, cotton, flax, hemp, jute, spinach, lettuce, asparagus, cabbages, carrots, onions, tomatoes, potatoes, or paprika.

59. The use according to clause 58, wherein the ALS-resistant plants are present in a crop of wheat, including both soft wheat and durum wheat, barley, rye, oats, triticale, maize, rice, soybeans, cotton, tomatoes and potatoes.

60. The use according to clause 59, wherein the ALS-resistant plants are present in a crop of wheat, including both soft wheat and durum wheat, barley, rye, oats and triticale.

61. The use according to any of clauses 33 to 60, wherein the ALS-tolerant plants comprise *Stellaria* spp., *Papaver* spp. or *Matricaria* spp.

62. The use according to clause 61, wherein the ALS-tolerant plants comprise *Stellaria media, Papaver rhoeas, Matricaria chamomilla* or *Matricaria inodora*.

63. The use according to any of clauses 33 to 62, wherein components (A) and (B) are applied in the form of one or more formulations selected from water-soluble concentrates (SL), emulsifiable concentrates (EC), oil in water emulsions (EW), micro-emulsions (ME), suspension concentrates (SC), oil-based suspension concentrates (OD), flowable suspensions (FS), water-dispersible granules (WDG), water-soluble granules (SG), wettable powders (WP), water soluble powders (SP), granules (GR), encapsulated granules (CG), fine granules (FG), macrogranules (GG), aqueous suspo-emulsions (SE), capsule suspensions (CS) and microgranules (MG).

64. The use according to clause 63, wherein components (A) and (B) are applied in the form of one or more formulations selected from water-dispersible granules (WDG), water-soluble granules (SG) and oil-based suspension concentrates (OD).

65. A composition for the control of ALS-tolerant plants comprising a herbicidally effective amount of a combination of (A) metribuzin and (B) one or more sulfonylureas.

66. The composition according to clause 65, wherein component (B) is a single sulfonyl urea.

67. The composition according to either of clauses 65 or 66, wherein the one or more sulfonylureas are selected from amidosulfuron, azimsulfuron, bensulfuron, chlorimuron, chlorsulfuron, cinosulfuron, cyclosulfamuron, ethametsulfuron, ethoxysulfuron, flazasulfuron, flucetosulfuron, flupyrsulfuron, foramsulfuron, halosulfuron, imazosulfuron, iodosulfuron, iofensulfuron, metazosulfuron, methiopyrisulfuron, metsulfuron, mesosulfuron, monosulfuron, nicosulfuron, orthosulfamuron, oxasulfuron, primisulfuron, propyrisulfuron, prosulfuron, pyrazosulfuron, rimsulfuron, sulfometuron, sulfosulfuron, thifensulfuron, triasulfuron, tribenuron, trifloxysulfuron, triflusulfuron and tritosulfuron.

68. The composition according to clause 67, wherein the one or more sulfonylureas are selected from thifensulfuron, tribenuron, metsulfuron, sulfosulfuron, amidosulfuron, mesosulfuron, iodosulfuron, rimsulfuron, nicosulfuron and halosulfuron.

69. The composition according to any of clauses 65 to 68, wherein the weight ratio of (A) metribuzin and (B) one or more sulfonylureas is up to 400:1.

70. The composition according to clause 69, wherein the weight ratio of (A) metribuzin and (B) one or more sulfonylureas is up to 70:1.

71. The composition according to any of clauses 65 to 70, wherein the weight ratio of (A) metribuzin and (B) one or more sulfonylureas is up to 10:1.

72. The composition according to any of clauses 65 to 71, wherein the weight ratio of (A) metribuzin and (B) one or more sulfonylureas is greater than 1:20.

73. The composition according to clause 72, wherein the weight ratio of (A) metribuzin and (B) one or more sulfonylureas is greater than 1:5.

74. The composition according to clause 73, wherein the weight ratio of (A) metribuzin and (B) one or more sulfonylureas is greater than 1:1

75. The composition according to any of clauses 65 to 74, wherein the weight ratio of (A) metribuzin and (B) one or more sulfonylureas is from 250:1 to 1:4.

76. The composition according to clause 75, wherein the weight ratio of (A) metribuzin and (B) one or more sulfonylureas is from 100:1 to 1:1.

77. The composition according to clause 76, wherein the weight ratio of (A) metribuzin and (B) one or more sulfonylureas is from 70:1 to 1:1.

78. The composition according to any of clauses 65 to 77, wherein the composition is a formulation selected from water-soluble concentrates (SL), emulsifiable concentrates (EC), oil in water emulsions (EW), micro-emulsions (ME), suspension concentrates (SC), oil-based suspension concentrates (OD), flowable suspensions (FS), water-dispersible granules (WDG), water-soluble granules (SG), wettable powders (WP), water soluble powders (SP), granules (GR), encapsulated granules (CG), fine granules (FG), macrogranules (GG), aqueous suspo-emulsions (SE), capsule suspensions (CS) and microgranules (MG).

79. The composition according to clause 78, wherein the composition is a formulation selected from water-dispersible granules (WDG), water-soluble granules (SG) and oil-based suspension concentrates (OD).

The invention claimed is:

1. A method for the control of the growth of ALS-resistant plants comprising applying to the plants and/or their locus a herbicidally effective amount of a combination of (A) metribuzin and (B) sulfosulfuron, the metribuzin is applied at 400 g/ha, a weight ratio of metribuzin to sulfosulfuron is between 10:1 and 5:1, and the applied composition does not contain another herbicide.

2. The method according to claim 1, wherein the components (A) metribuzin and (B) sulfosulfuron are applied at an application rate of up to 2 kg/ha of the total amount of active ingredients being applied.

3. The method according to claim 1, wherein the components (A) metribuzin and (B) sulfosulfuron are applied to the plants and/or their locus post-emergence.

4. The method according to claim 1, wherein the ALS-resistant plants are present in a crop of wheat, including both soft wheat and durum wheat, barley, rye, oats, maize, rice, sorghum, triticale, beans, lentils, peas, soybeans, and peanuts, cotton, flax, hemp, jute, spinach, lettuce, asparagus, cabbages, carrots, onions, tomatoes, potatoes, or paprika.

5. The method according to claim 1, wherein the ALS-tolerant plants comprise *Stellaria* spp., *Papaver* spp. or *Matricaria* spp.

6. The method according to claim 1 wherein components (A) and (B) are applied in the form of one or more formulations selected from water-dispersible granules (WDG), water-soluble granules (SG) and oil-based suspension concentrates (OD).

7. The method according to claim 1, wherein the components (A) metribuzin and (B) sulfosulfuron are applied at an application rate of up to 1.5 kg/ha of the total amount of active ingredients.

* * * * *